Patented May 6, 1941

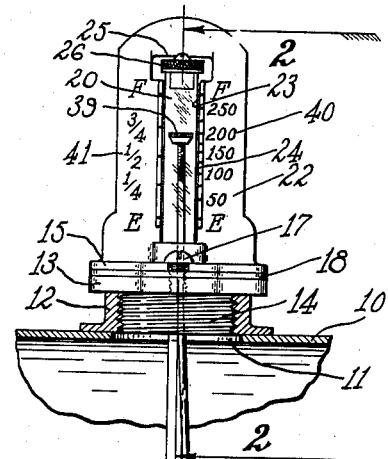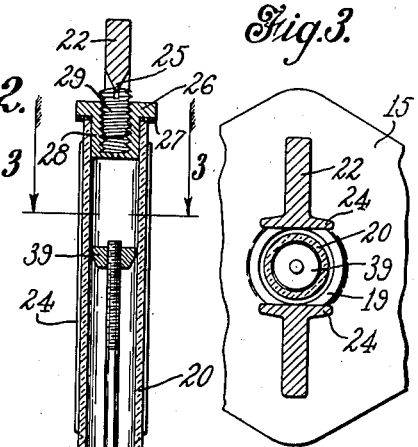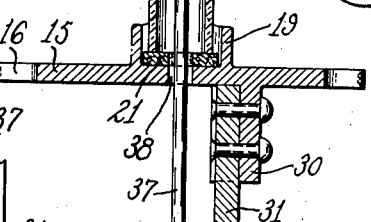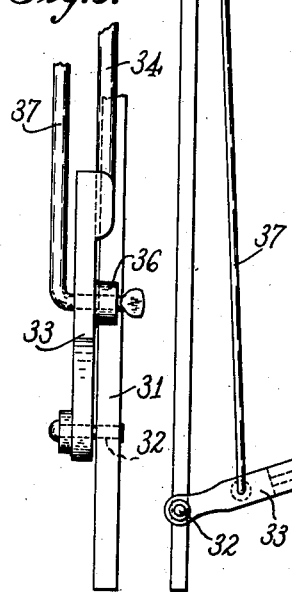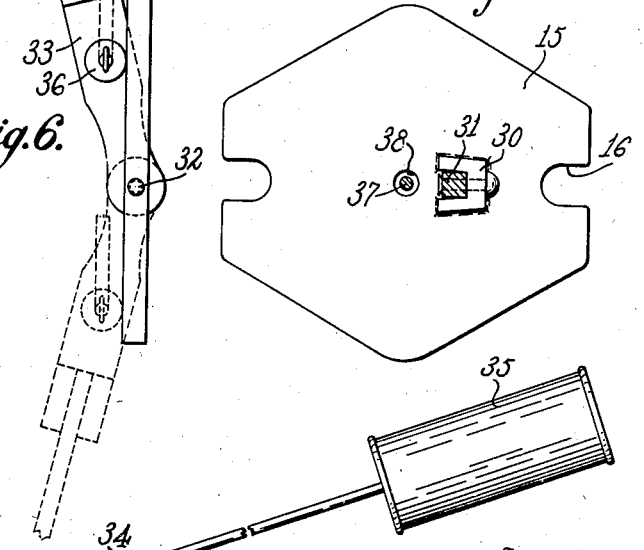

2,240,669

UNITED STATES PATENT OFFICE 2,240,669

LIQUID GAUGE

Michael P. Russo, New Haven, Conn.

Application November 30, 1938, Serial No. 243,185

2 Claims. (Cl. 73—317)

This invention relates to liquid gauges, and more particularly to a gauge designed to be used with a liquid-containing tank, the gauge being so constructed that it may be readily secured to a cap or collar threaded into a bushing or neck member secured to the tank. The gauge structure is comprised in a unitary mechanism so that it may be assembled and adjusted at the factory, and thereafter inserted into the tank and secured to the bushing and designed to give a correct registration of the amount of liquid which the tank contains.

The gauge herein shown is one of the float type in that it is provided with a pivoted or swinging arm carrying a float on its outer end, which float rises and falls with the level of the liquid within the tank. The rising and falling of the float operates a vertical rod pivoted to the swinging arm, which vertical rod terminates in an indicator in a glass tube above the tank, and the rising or falling of this indicator within the tube is read upon a scale adjacent the tube, which scale may read in either gallons or fractions of capacity, or both.

One object of the present invention is to provide a gauge of this character of very simple construction, so that it may be economically manufactured, and which at the same time will be reliable and accurate in its indications of the amount of liquid in the tank.

Another object of the invention is the improvement of the scale and associated parts of the gauge, which are disposed above the tank in an exposed position. This part of the gauge includes as one element a transparent tube, usually made of glass, and the scale member adjacent the tube is so constructed that the tube will be partially surrounded or embraced thereby so as to receive protection therefrom.

A still further object of the invention is the provision of a liquid gauge of the character described having a scale member and a transparent tube above the tank, whereby the tube and scale member may be readily and conveniently assembled securely together, and the tube may also be readily detached and cleaned or replaced by a new one when necessity requires.

To these and other ends the invention consists in the novel features and combinations of parts to be hereinafter described and claimed.

In the drawing:

Fig. 1 is a front elevational view of a liquid gauge embodying my invention;

Fig. 2 is a sectional view through the upper portion of the gauge on line 2—2 of Fig. 1;

Fig. 3 is a sectional view on line 3—3 of Fig. 2;

Fig. 4 is a bottom plan view of the upper portion of the gauge, the stem being shown in section;

Fig. 5 is a detail view showing the method of securing the float and vertical rod to the stem; and Fig. 6 is a view similar to Fig. 5 but showing the parts in another position.

To illustrate a preferred embodiment of my invention, I have shown a fragmentary portion 10 of a tank designed to contain liquid, the tank being provided with an opening 11 in its upper side, which opening is surrounded by an internally-threaded neck 12. To the neck is designed to be secured a cap 13, this cap having a depending externally-threaded hollow bushing or collar 14 designed to fit the internal threads of the neck 12 so as to secure the cap in place.

The gauge structure is designed to be secured to the cap 13, and the part of the gauge which lies within the tank may be inserted therein through the bushing 14 after the cap 13 has been secured to the neck 12. For this purpose the gauge is provided with a base member 15 consisting of a relatively flat plate which may be of the same general dimensions as the cap 13, and which is provided with openings or notches 16 through which may be passed screws 17 received in the cap 13 to secure the gauge thereto. Between the base plate 15 and the cap 13 may be placed a gasket or washer 18, so as to make an air-tight joint.

The base plate and associated parts are shown in section in Fig. 2, from which it will be noted that on its upper surface the base plate is provided with a shallow socket 19 to receive the lower end of the transparent tube 20, the lower edge of which may rest upon a gasket or washer 21 to make an air-tight joint at this point.

Upstanding from the base 15 is a scale plate 22, which scale plate is secured to the base member 15 and preferably is cast integrally therewith. This scale plate is provided with a central elongated opening or slot 23, designed to accommodate the tube 20, the slot communicating at its lower end with the socket 19. Upon each side of this slot are provided laterally projecting flanges 24, which project from the faces of the scale plate in both directions and on both sides of the tube 20, as shown in Fig. 3, so as to partially embrace this tube and protect it against injury, while leaving it exposed at the front and back, so that the position of the indicator within the tube, which will be referred to hereinafter, may be correctly read.

The slot 23 is closed at its upper end, and the edge of the scale plate at this point is relatively sharp, as shown at 25, this sharp edge projecting downwardly to face the upper portion of the transparent tube. The tube is closed at its upper end by a cap 26, the upper flange of which overlies the edge of the tube and rests upon a washer 27, and the body portion 28 of the cap lying within the tube, as clearly shown in Fig. 3, and provided with an internally threaded opening to receive a threaded screw 29. As will be seen from this figure, the notch in the upper end of the screw is designed to receive the sharp edge 25 at the upper end of the slot 23 so as to hold this screw against rotation.

Before the tube has been placed within the socket 19 and within the slot in the scale plate 22, the cap 26 is slipped on the upper end of the tube, with the screw 29 retracted into the body portion of the cap. The tube may then be put into place. The cap may then be slightly raised, the fingers grasping the upper flange portion thereof until the sharp edge 25 is received in the slot in the screw. The cap 26 may then be rotated in the proper direction to cause the screw to back off from the cap and rise with respect thereto toward the upper portion of the scale plate. This operation is continued until the parts fit tightly together, the screw forcing the cap down tightly upon the washer 27 upon the upper end of the tube. Detachment of the parts can readily be effected by a reverse rotation of the cap, until sufficient clearance is present to permit the tube and cap to be withdrawn laterally from the slot 23 at the top, and then removed from the socket 19.

In Fig. 4 of the drawing the under side of the base plate 15 is shown, from which it will be observed that there is formed integrally with the plate 15 a depending lug 30 substantially channel-shaped in cross section. Within this channel is snugly received an elongated stem 31 which projects into the tank and carries the float and associated mechanism. Pivoted at 32 to the lower end of this stem (Fig. 1) is a lever 33 to which is secured a float rod 34 carrying a float 35 upon the free end thereof. The lever 33 is provided with a projecting boss 36 at the central portion thereof, the boss and lever being provided with an opening in which is loosely received the lower bent end of a substantially vertically extending indicator rod 37.

The indicator rod 37 projects upwardly through the hollow bushing of the cap 13 and through an opening 38 in the plate 15, so that its upper end is received within the transparent tube 20, as shown in Figs. 1 and 2. A button or similar indicating device 39 may be threaded or otherwise adjustably secured at the upper end of this rod. This button may be of some readily distinguishable color, such as red, for example, so that its position may readily be seen through the wall of the tube.

Upon each side of the flanges 24 the scale plate 22 may be provided with indicia indicating the amount of liquid within the tank when the indicator button 39 is at a given level. As shown in Fig. 1, the indicia is so arranged as to read in gallons upon one side of the scale, as shown at 40, and in fractions of capacity on the other side of the scale, as shown at 41.

The threaded connection of the indicator button 39 with the rod 37 provides for adjustment of the indicator for individual tanks, so that it may be corrected for the base reading thereof. Attention may also be called to the fact that the boss 36, as shown, for example, in Figs. 5 and 6, projects outwardly from the lever 33 on the same side thereof as the stem 31, so that this button will contact with the stem when the float rod 34 approaches a vertical position to serve as a stop for the lever and this rod. In full lines in Fig. 6 this boss is shown as lying against the stem 31 when the float is in its uppermost position corresponding to a full condition of the tank. In the same figure in dotted lines the boss 36 is shown contacting the stem 31 when the float is at its lowermost position, as it will be when the tank is empty.

It will be apparent from the above that the gauge herein shown is of very simple construction, but at the same time is reliable and efficient, and it may be readily assembled and secured to the tank to make an air-tight connection therewith. It will also be noted that the transparent tube 20, which is usually made of glass, is well protected from injury, while at the same time the wall thereof is exposed at the front and back to permit the reading of the position of the indicator button 39.

While I have shown and described a preferred embodiment of my invention, it will be understood that it is not to be limited to all of the details shown, but is capable of modification and variation within the spirit of the invention and within the scope of the appended claims.

What I claim is:

1. A liquid gauge comprising a cap designed to be secured to a tank or the like, a base plate adapted to be detachably secured to the cap, a scale member upstanding from the base plate, said member being provided with an elongated opening, a transparent tube disposed within said opening and resting on the base plate, a cover closing the upper end of the tube, a screw threaded in the top of the cover, and means on the upstanding scale member to non-rotatably engage said screw whereby rotation of the cover will effect tight engagement of the parts.

2. A liquid gauge comprising a cap designed to be secured to a tank or the like, a base plate adapted to be detachably secured to the cap, a scale member upstanding from the base plate, said member being provided with an elongated opening, a transparent tube disposed within said opening and resting on the base plate, a cover closing the upper end of the tube, a screw threaded in the top of the cover, said opening being closed at its top, and the downwardly-facing upper edge of said opening being non-rotatably engaged with said screw to hold it against rotation whereby rotation of the cover will effect tight engagement of the parts.

MICHAEL P. RUSSO.